United States Patent
Tayi Dhar et al.

(10) Patent No.: US 10,326,154 B2
(45) Date of Patent: Jun. 18, 2019

(54) ON DEMAND VARIABLE SUPPLY FUEL CELL

(71) Applicant: Google LLC, Mountain View, CA (US)

(72) Inventors: Nikesh Tayi Dhar, San Jose, CA (US); Ajay Babu Kamath, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 234 days.

(21) Appl. No.: 15/447,046

(22) Filed: Mar. 1, 2017

(65) Prior Publication Data

US 2018/0254501 A1 Sep. 6, 2018

(51) Int. Cl.

| H01M 10/44 | (2006.01) |
| H01M 8/04992 | (2016.01) |
| H01M 8/04746 | (2016.01) |
| H01M 8/04082 | (2016.01) |
| H02J 7/00 | (2006.01) |
| H01M 8/1009 | (2016.01) |
| H01M 8/04186 | (2016.01) |

(Continued)

(52) U.S. Cl.
CPC ... *H01M 8/04992* (2013.01); *H01M 8/04186* (2013.01); *H01M 8/04201* (2013.01); *H01M 8/04626* (2013.01); *H01M 8/04753* (2013.01); *H01M 8/1009* (2013.01); *H01M 10/44* (2013.01); *H02J 7/0054* (2013.01); *H01M 2008/1095* (2013.01)

(58) Field of Classification Search
CPC .................................................. H01M 8/04992
USPC ........................................................ 320/101
See application file for complete search history.

(56) References Cited

U.S. PATENT DOCUMENTS

| 3,615,845 A | 10/1971 | Gray | |
| 5,929,594 A * | 7/1999 | Nonobe | B60L 11/1881 320/104 |

(Continued)

FOREIGN PATENT DOCUMENTS

| JP | 2008276988 A | 11/2008 |
| JP | 2011119113 A | 6/2011 |

OTHER PUBLICATIONS

International Search Report and Written Opinion of the International Searching Authority dated May 30, 2018, issued in connection with International Application No. PCT/US2018/020120, filed on Feb. 28, 2018, 14 pages.

*Primary Examiner* — Yalkew Fantu
(74) *Attorney, Agent, or Firm* — McDonnell Boehnen Hulbert & Berghoff LLP

(57) ABSTRACT

An example on demand, variable supply fuel cell may include an anode coupled to provide electrical continuity for output power of the fuel cell, a cathode coupled to provide electrical continuity for the output power of the fuel cell, a membrane electrode assembly (MEA) disposed between the anode and cathode, the MEA coupled to generate the output power in response to exposure to a fuel, a plurality of capillary tubes to deliver the fuel to the MEA, wherein a first end of each of the plurality of capillary tubes is disposed adjacent to the MEA, and a plate isolator coupled to expose a second end of one or more capillary tubes of the plurality of capillary tubes to the fuel in response to a control signal, where the control signal is based on an amount of output power the fuel cell is to generate.

17 Claims, 5 Drawing Sheets

(51) Int. Cl.
*H01M 8/04537* (2016.01)
*H01M 8/1018* (2016.01)

(56) References Cited

U.S. PATENT DOCUMENTS

| | | | |
|---|---|---|---|
| 6,580,977 B2* | 6/2003 | Ding | B60L 11/1887 180/307 |
| 6,672,415 B1* | 1/2004 | Tabata | B60K 6/365 180/65.25 |
| 7,556,877 B2 | 7/2009 | Suda et al. | |
| 8,003,239 B2* | 8/2011 | Tsuji | H01M 8/04089 429/48 |
| 8,846,269 B2* | 9/2014 | Okanishi | H01M 8/026 429/514 |
| 2003/0059659 A1* | 3/2003 | Kamo | H01M 4/8631 429/456 |
| 2008/0008919 A1 | 1/2008 | Mizukami et al. | |
| 2009/0136794 A1 | 5/2009 | Eccarius | |
| 2009/0274938 A1 | 11/2009 | Osada et al. | |
| 2011/0269039 A1 | 11/2011 | Wilkinson et al. | |

\* cited by examiner

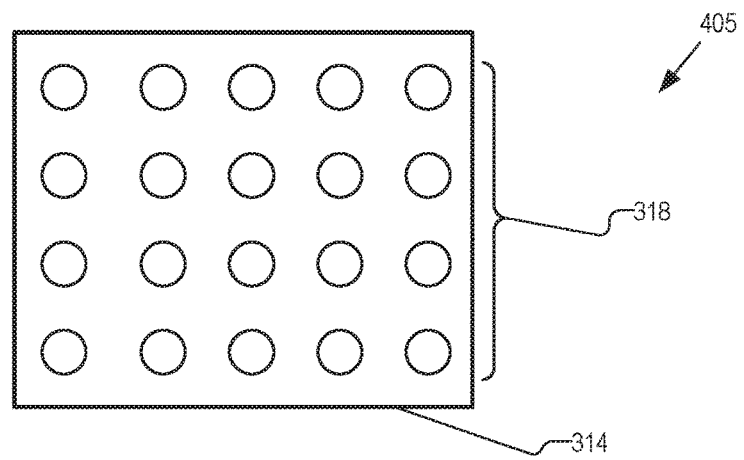
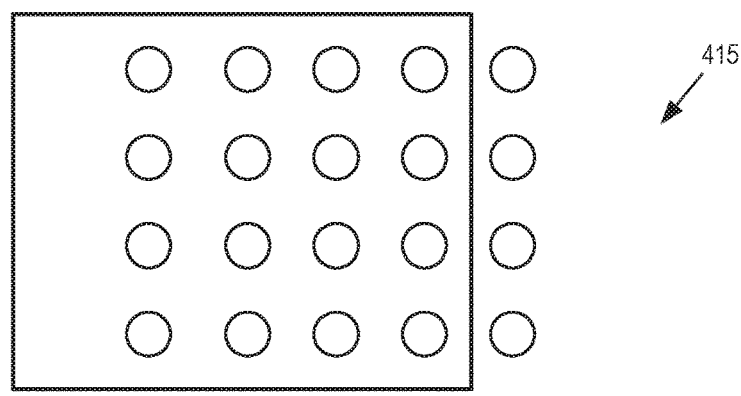
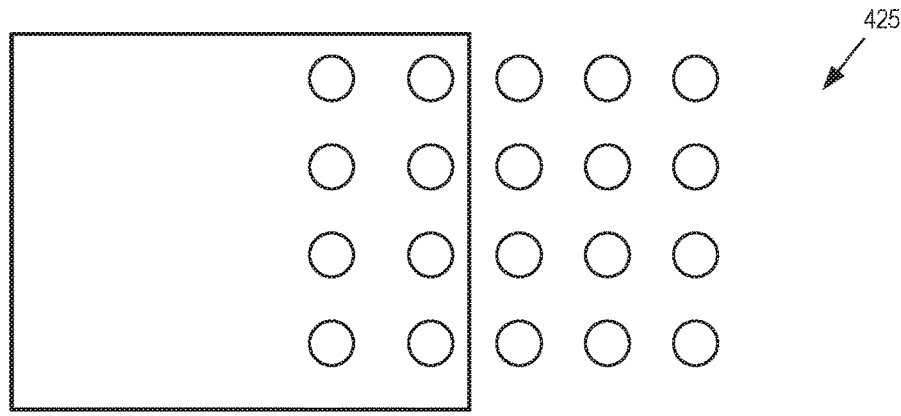
FIG. 4

ON DEMAND VARIABLE SUPPLY FUEL CELL

TECHNICAL FIELD

This disclosure relates generally to fuel cells, and in particular but not exclusively, to variable supply fuel cells.

BACKGROUND INFORMATION

Fuel cells are devices that convert chemical energy into electrical energy. The electrical energy may be generated as long as a fuel is provided to an electrolyte/reaction site. The electrolyte may be sandwiched between an anode and a cathode that provide the electrical output. The fuel may be provided to the electrolyte/reaction site via a pump, for example. Along with the pump, fuel cells may conventionally include other active components, such as a fan. The active components, pump, fan, etc., may consume a portion of the generated energy, which will reduce the overall efficiency of the fuel cell. Additionally, conventional fuel cells generate energy at a maximum possible rate since all possible fuel is supplied to electrolyte/reaction site as there is no control of the amount of fuel supplied, and additionally all of the electrolyte/reaction site, e.g., area, participates in energy conversion. Because the electrolyte has a limited lifetime, the more exposure the shorter the electrolyte's use. While there have been advances in fuel cell technology to address efficiency concerns, the advances have yet to address the above issues.

SUMMARY

On demand, variable supply fuel cells are disclosed herein. An example on demand, variable supply fuel cell may include an anode coupled to provide electrical continuity for output power of the fuel cell, a cathode coupled to provide electrical continuity for the output power of the fuel cell, a membrane electrode assembly (MEA) disposed between the anode and cathode, the MEA coupled to generate the output power in response to exposure to a fuel, a plurality of capillary tubes to deliver the fuel to the MEA, wherein a first end of each of the plurality of capillary tubes is disposed adjacent to the MEA, and a plate isolator coupled to expose a second end of one or more capillary tubes of the plurality of capillary tubes to the fuel in response to a control signal, where the control signal is based on an amount of output power the fuel cell is to generate.

An example method for operating an on demand, variable supply fuel cell may include receiving a status of a battery of a device to be charged by the fuel cell, determining a subset of capillary tubes of a plurality of capillary tubes of the fuel cell to expose to fuel, and exposing the subset of capillary tubes to the fuel.

Another example of an on demand, variable supply fuel cell may include a cathode coupled to provide electrical power generated by the fuel cell, an anode coupled to provide electrical power generated by the fuel cell, a membrane electrode assembly coupled to receive fuel and generate the electrical power in response, a plurality of capillary tubes having a first end disposed adjacent to the membrane electrode assembly and a second end disposed adjacent to a plate isolator, and control circuitry coupled to receive a battery status from a device coupled to receive the electrical power from the fuel cell. The control circuity includes at least one machine-accessible storage medium that provides instructions that, when executed by the control circuitry, will cause the fuel cell to determine an amount of power to generate based on the battery status received from the device, based on the amount of power to generate, determine a number of capillary tubes to expose to fuel, where the capillary tubes provide the fuel to the MEA, and expose the determined number of capillary tubes to the fuel.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 4 shows example plate isolator locations 405, 415, and 425 in accordance with an embodiment of the disclosure.

DETAILED DESCRIPTION

Embodiments of a system and method for an on demand, variable supply fuel cell are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
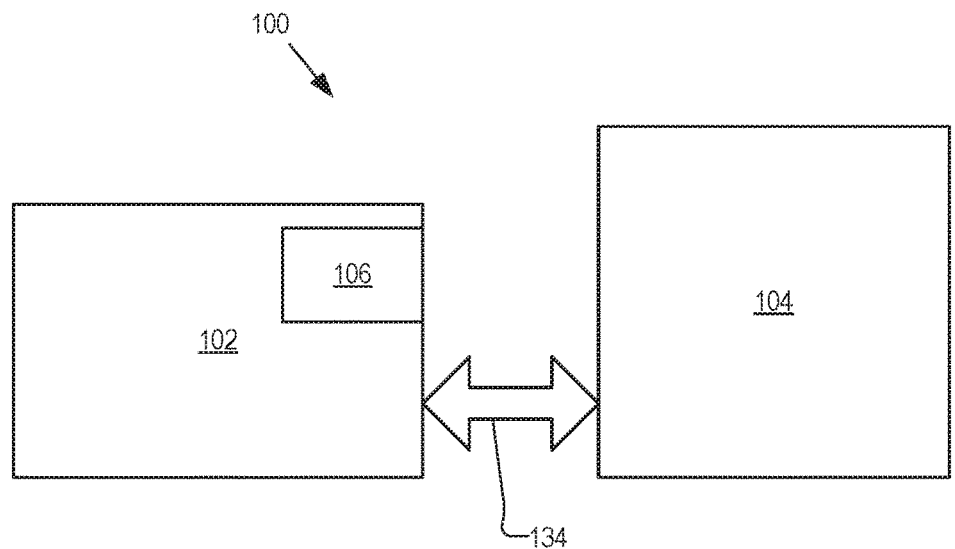
FIG. 1 is a block diagram of a system 100 in accordance with an embodiment of the present disclosure.

FIG. 1 is a block diagram of a system 100 in accordance with an embodiment of the present disclosure. The system 100 may be an example of a device charging system that uses an on demand variable supply fuel cell to charge a battery of the device. The system 100 may use feedback from the device to be charged to determine how much power to generate. The required power may determine an amount of fuel to provide an electrolyte for power generation, and metering the fuel usage may extend the life of the electrolyte and increase the efficiency of the fuel cell. As such, the fuel cell may generate the power on demand and generate just the amount needed for charging the device.

The illustrated embodiment of the system 100 includes a fuel cell 102 electrically coupled to charge a device 104 via electrical coupling 134. The device 104 may be any electronics device that includes a rechargeable battery, such as a portable phone, laptop computer, tablet, medical device, etc. The device 104 may be electrically coupled to the fuel cell 102 to charge the battery of the device 104. When electrically coupled, the device 104 may inform the fuel cell 102 of a current status of the device's battery, e.g., a percentage of battery remaining, a battery capacity, a desired amount of power, etc. Based on the current status of the device's battery, for example, the fuel cell 102 may determine how much energy to generate to charge the device's battery to a desired level. In some embodiments, the desired level would be fully charged.

The illustrated embodiment of the fuel cell 102 may include a fuel cell stack and control circuitry 106. The fuel cell stack includes a cathode, a membrane electrode assembly (MEA) or electrolyte/reaction site, a cathode, a fuel reservoir containing fuel, a fuel transport array, and a fuel usage regulator. The fuel usage regulator may be coupled to the control circuitry 106 so that a desired amount of fuel is provided to the MEA. The MEA may generate charge when provided the fuel, and the charge may be provided by the cathode and anode. The power may be provided to the device 104 via the electrical coupling 134.

The control circuitry 106 may receive the current battery status via the electrical coupling 134. Based on the current battery status, the control circuitry 106 may determine an area of the MEA needed to be exposed to the fuel to generate the needed power to charge the device 104. Further, based on the area of the MEA needing fuel, the control logic 106 may determine how many tubes of the fuel transport array to expose to the fuel. The number of tubes needed to deliver fuel to the desired area of the MEA may determine how many valves to open or how far to move a plate isolator of the fuel usage regulator. Due to the control circuitry 106 providing enough fuel to generate the desired power, there may be no fuel usage that may result if the entire area of the MEA were to be provided fuel, which may reduce or eliminate any fuel wastage.

Figure 2:
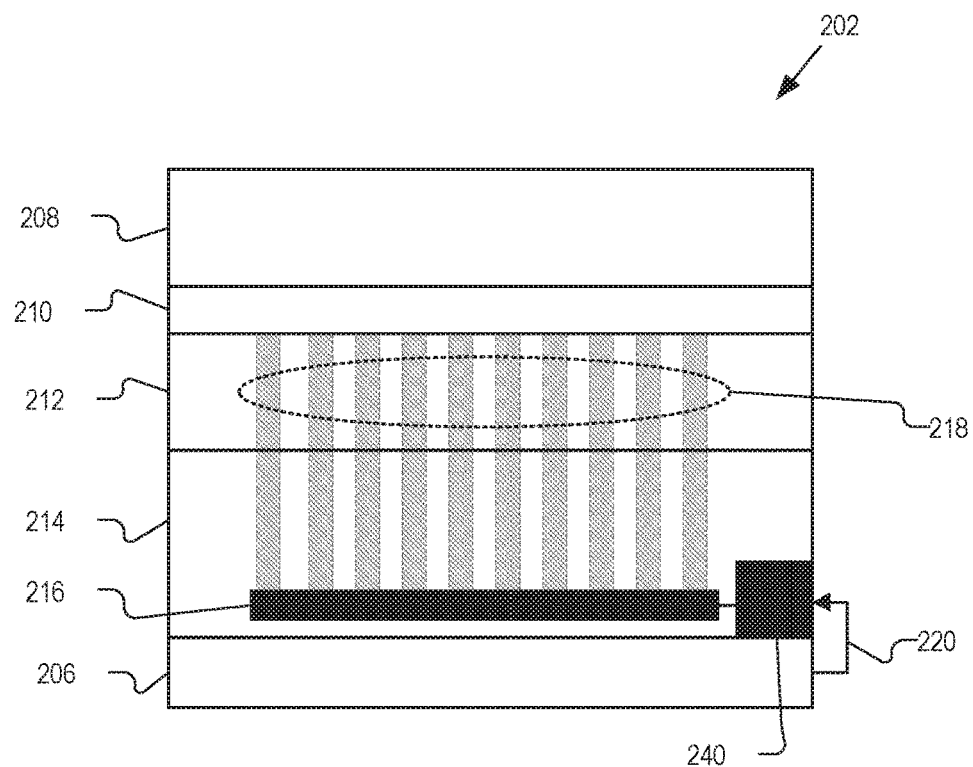
FIG. 2 is an illustrative block diagram of a fuel cell 202 in accordance with an embodiment of the disclosure.

FIG. 2 is an illustrative block diagram of a fuel cell 202 in accordance with an embodiment of the present disclosure. The fuel cell 202 may be one example of the fuel cell 102 and may provide power on demand in various amounts based on feedback provided by a device to be charged. The illustrated embodiment of the fuel cell 202 includes a cathode 208, an MEA 210, an anode 212, a reservoir 214, a fuel usage regulator 216, a fuel transport array 218, and control circuitry 206.

The cathode 208 may be a conductive component that provides electrical continuity for providing power from the fuel cell 202. In some embodiments, the cathode 208 may be referred to as the "positive" terminal for providing electrical continuity. The cathode 208 may be coupled to an external electrical connection, such as the electrical coupling 134, for providing power to an external device. The cathode 208 may be formed from a metal, for example, and may provide a medium for providing positive charge to ions transported by the MEA 210. In some embodiments, the type of metal may depend on various factors of the fuel cell, such as fuel type and/or MEA type. In some embodiments, the cathode 208 may be formed from stainless steel.

The MEA 210 is an assembled stack of either a proton exchange membrane or an alkali ion exchange membrane, along with a catalyst. The MEA 210 may be disposed between the cathode 208 and the anode 212. The MEA 210 electrically insulates the cathode 208 from the anode 212, but allows for proton transport from the anode 212 to the cathode 208. While allowing for proton transport, the MEA 210 causes electrons generated to flow through a conductive path to the cathode 208. The conductive path flowing through an electrical load, such as the device 104. Additionally, the MEA 210, along with the catalyst, provides a medium for reaction of a fuel to generate the electrical power, e.g., the protons that flow through the MEA 210 and the electrons that flow through a circuit providing power. The reaction that generates the electrical power occurs on a surface of the MEA 210 closest to the anode 212, with electrons generated by the reaction provided to the anode 212 for delivery as current, and protons generated by the reaction propagating through the MEA 210 to a surface adjacent with the cathode 208.

The amount of power generated may depend on an amount of surface area of the MEA 210 exposed to a fuel. In some embodiments, the MEA 210 may be rated for a maximum power generation based on exposure of the full surface area to the fuel. As such, the power generation may be a one-to-one ratio of area. For example, of the MEA 210 is rated at 100 Watts, then exposure of 10% of the area may provide a tenth of the rated power, e.g., 10 W. Based on this relationship, if an amount of power needed to be generated is known, then the area required to be exposed to the fuel may be straightforwardly deduced.

The anode 212 may be a conductive component that provides the other half of the continuity when power is provided by the fuel cell 202. In some embodiments, the anode may be referred to as the "negative" terminal for providing electrical continuity. In general, material used to form the anode 212 may depend on the type of fuel and MEA. In some embodiments, the anode 212 may be formed from carbon. Additionally, the anode 212 may have vias formed through it to provide one or more paths for delivery of the fuel to the surface of the MEA 210. In some embodiments, the one or more paths may be vias formed through the anode 212. For example, an array of vias may be formed in the anode 212. For example, the fuel transport array 218 may extend through the vias formed in the anode 212.

The reservoir 214 may be a hollow compartment, e.g., tank, disposed on a side of the anode 212 opposite from the MEA 210. The reservoir 214 may provide a cavity for storing a fuel, such as methanol or ethanol. In some embodiments, the reservoir 214 may include a port for refilling the fuel, which may be beneficial both from a sustaining point of view and an economic point of view. For example, a rubber or latex port that may receive a needle may be formed in a sidewall of the reservoir 214. A capacity of the reservoir 214 may be determined by the size of the reservoir, and the size is a non-limiting aspect of the present disclosure.

The fuel transport array 218 may provide the fuel form the reservoir 214 to the MEA 210. In some embodiments, the fuel transport array 218 may be formed into a two-dimensional array that extends across a surface area of the MEA 210, and by extension the anode 212. In some embodiments, the fuel transport array 218 may include a plurality of capillary tubes. In such an embodiment, each of the capillary tubes may have an inner diameter capable of transporting the fuel via capillary forces to the MEA 210. The inner diameter of the capillary tubes may depend on characteristics of the fuel, such as its viscosity and/or density, and may further depend on a distance the fuel is to be transported. The fuel transport array 218 may be formed from a material that may be non-reactive with the fuel implemented in the fuel cell 202. For example, the fuel transport array 218 may be formed from glass, plastic, metal, or from a biodegradable substance, which may include plant root like material.

The fuel usage regulator 216 may be disposed within the reservoir 214 and may be in contact with a distal end of the fuel transport array 218. In some embodiments, the plate isolator 216 may seal off the distal end of the fuel transport array 218 to prevent fuel from being provided to the MEA 210 when not desired. Additionally, the fuel usage regulator 216 may expose all or a portion of the fuel transport array 218 to the fuel to transport a desired amount of fuel to the MEA 210. The fuel usage regulator 216 may be coupled to receive control signals from the control circuitry 206. The control signals may cause the fuel usage regulator 216 to activate, e.g., move, so that all or a portion of the fuel transport array 218 is exposed to the fuel. For example, the fuel usage regulator 216 may be actuated by mechanism 240, which may be coupled to receive the control signals form the control circuitry 206. The mechanism 240 may include any means of moving the fuel usage regulator 216, and all means are contemplated herein. For example, the mechanism 240 may be a stepper motor, a belt drive, a linear motor, or may use conductive forces, and etc.

In some embodiments, the fuel usage regulator 216 may be a plate isolator that may cover the distal end of the fuel transport array 218. However, other mechanisms may also be implemented to control the exposure of the fuel transport array 218 to the fuel. For example, instead of a single plate isolator, the fuel usage regulator may be formed from a plurality of small plate isolators or valves. The fuel usage regulator 216 may be formed from any material that may be non-reactive with a fuel. For example, the fuel usage regulator 216 may be formed from plastic, metal, ceramic, etc. In some embodiments, the fuel usage regulator 216 may have one or more surface coatings that promote a seal between the fuel usage regulator 216 and the fuel transport array 218. However, it may be undesirable for the one or more surface coatings to inhibit movement of the fuel usage regulator 216.

Control circuitry 206 may control the operation of the fuel cell 202 based on feedback from a device to be charged. In some embodiments, the control circuitry 206 may be coupled to the fuel usage regulator 216 via a coupling 220 to control the movement of the fuel usage regulator 216. The coupling 220 may provide control signals to the mechanism 240 to control the movement of the fuel usage regulator 216, for example. The control circuitry 206 may receive information from a device to be charged that informs the control circuitry 206 of a current status of the device's battery. For example, the device may provide information pertaining to a percentage of full of the battery, e.g., 40%, 60%, 90%, etc. Of course, data other than a percent full may be provided, such as how much power is required to fill the battery, e.g., watts. Based on the current status of the device's battery, the control circuitry 206 may determine how far to move the fuel usage regulator 216. The distance the fuel usage regulator 216 is moved may be based on an area of the MEA 210 that needs to be provided fuel to generate the amount of power to charge the battery of the device. The needed area may then determine a portion of the fuel transport array 218 to expose to the fuel, which, in turn, determines how to move the fuel usage regulator 216.

Figure 3:
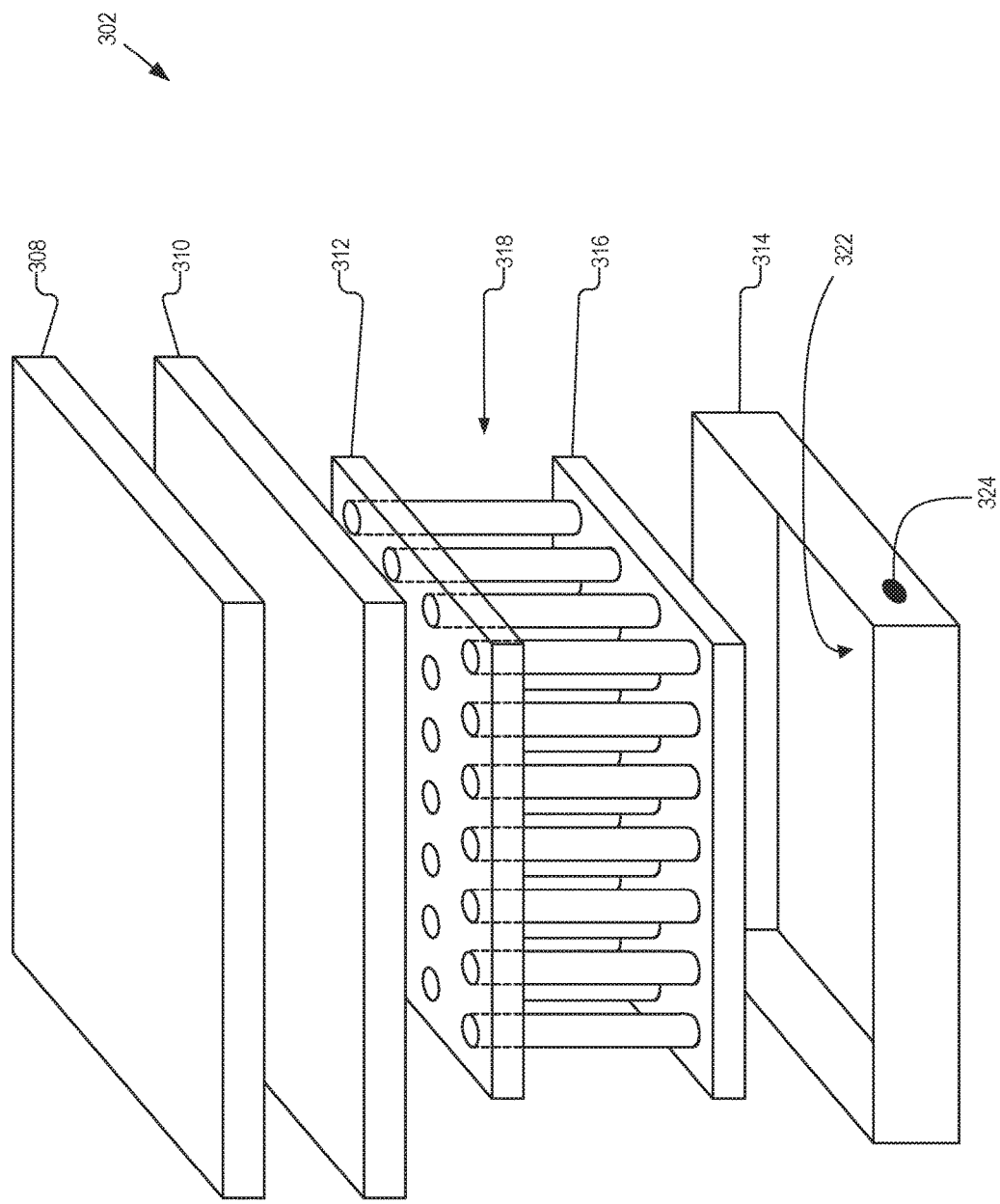
FIG. 3 is an exploded view of a fuel cell 302 in accordance with an embodiment of the disclosure.

FIG. 3 is an exploded view of a fuel cell 302 in accordance with an embodiment of the present disclosure. The fuel cell 302 may be an example of the fuel cells 102 and/or 202. The illustrated embodiment of the fuel cell 302 includes a cathode 308, an MEA 310, an anode 312, a fuel transport array 318, a fuel usage regulator 316, and a reservoir 306. Some of the features of the fuel cell 302 will not be discussed in detail for sake of brevity, and similar to like features of the fuel cell 102 and/or 202. For example, the cathode 308 and the MEA 310 may not be discussed in detail. It should be noted that the fuel cell 302 is not drawn to scale and that various components may have relative sizes to one another that are different than depicted. For example, the reservoir 306.

The illustrated embodiment of the fuel transport array 318 includes a plurality of capillary tubes 336. The plurality of capillary tubes 336 may be formed into a two-dimensional array so that each capillary tube may provide fuel to a different location on a surface of the MEA 310. In some embodiments, the two-dimensional array may form a rectangle, but other arrangements are contemplated herein. The plurality of capillary tubes 336 may extend through vias formed in the anode 312. Although other arrangements of the capillary tubes 318 may be implemented, extending the capillary tubes 336 through the anode 312 may be the most direct route from the reservoir 314 to the MEA 310. Additionally, extending the capillary tubes 336 through the vias may allow for an overall size reduction of the fuel cell. For each capillary tube 336, a first end may extend to an edge of the anode 312 that is adjacent to and contacting the MEA 310, and a second end may abut or be adjacent to the fuel usage regulator 316.

The illustrated embodiment of the fuel usage regulator 316 may be a single plate isolator 338. The plate isolator 338 may isolate, e.g., seal off, ends of the capillary tubes 336 from the fuel. In some embodiments, the plate isolator 338 may be mechanically or electrically moved by a mechanism, such as the mechanism 240, to expose a distal end of one or more capillary tubes 338 to the fuel. A distance of movement of the plate isolator 338 may determine how many capillary tubes 338 are exposed to fuel. Control circuitry, such as the control circuitry 106/206 may provide one or more control signals to the plate isolator 338 to cause the plate isolator 338 to move a desired distance. As previously discussed, the number of capillary tubes 338 exposed to the fuel may depend on an amount of power to generate and an area of the MEA 310 to provide fuel.

The reservoir 314 may include a cavity 322 for storage of a fuel. The reservoir 314 may also house the fuel usage regulator 316 and the portion of the capillary tubes 336 that extend from the anode 312 to the fuel usage regulator 316. In some embodiments, the reservoir 314 may include a port 324 that may be used for refilling the fuel. For example, the port 324 may be formed from rubber, that may be penetrated by a syringe to inject fuel.

In some embodiments, the plate isolator 338 may be arranged close to a bottom of the reservoir 314 so that the capillary tubes 318 extend near a bottom of the reservoir 314. By arranging the plate isolator 3388 and the capillary tubes 318 as such, the distal ends of the capillary tubes 318 may be submersed into the fuel so that fuel is accessible even when low. Of course, other arrangements, e.g., depths, of the plate isolator 338 and capillary tubes 318 within the reservoir 314 may be implemented.

FIG. 4 shows example plate isolator locations 405, 415, and 425 in accordance with an embodiment of the present disclosure. The plate isolator locations 405, 415, and 425 may correspond to exposing different portions of the capillary tubes 336 to fuel so that a desired area of MEA 310 is provided said fuel. Because the amount of power generated by the MEA 310 is based on area, the more area provided fuel, the more power generated. Further, the more power needed by a device to be charged, the further the plate isolator 338 may be moved to expose more of the fuel transport array 318. Although the plate isolator 338 and the capillary tubes 336 are used in the discussion of FIG. 4, their use is for ease of discussion and should not considered limiting on the present disclosure. In general, a fuel cell in accordance with the present disclosure may provide on demand power at varying levels by dynamically controlling an area of an MEA that is provided fuel. The embodiments disclosed herein are mere examples of systems and methods directed at that end.

The location 405 may be a first or default location for the plate isolator 338. When the plate isolator 338 is in the location 405, all of the capillary tubes 336 may be blocked from the fuel. Control circuitry, such as control circuitry 106 or 206, may move the plate isolator 338 into position 405 when no power is required be generated. In some embodiments, the plate isolator 338 may move into this default position in the absence of a control signal.

The location 415 may be another location for the plate isolator 336. The location 415, for example, may be selected by the control circuitry if only a small amount of power is desired to be generated. For example, if a device to be charged by the fuel cell 102/202/302 is already at 90% capacity, then energy to charge the device by 10% may desirably be generated. As such, the plate isolator 338 may be moved to expose one column/row of capillary tubes 336 to the fuel, for example. However, the number of tubes exposed when the plate isolator 338 is in location 415 may be different in different embodiments, and the four tubes shown is just an example. It should be noted that the number of capillary tubes 336 exposed by movement of the plate isolator 338 may depend on the area of the MEA 310 to be provided fuel.

The location 425 provides another example location for movement of the plate isolator 338. Moving the plate isolator 338 to the location 425 may expose a large number of capillary tubes 336 to the fuel, which, in turn, may provide fuel to a large area of the MEA 310. Accordingly, location 425 may generate more power than location 415. Additionally, location 425 may be selected by control circuitry when the device being charged is at a small charge status.

In some embodiments, the various locations 405, 415, and 425 may be preprogrammed locations associated with a corresponding amount of power. For example, if 10 W of power are to be generated, then control circuitry may cause the plate isolator 338 to move to location 415. In general, any amount of power of power to be generated may have an associated location stored by the control circuitry, for example. In some embodiments, the locations may be simply selected from a list containing locations and associated power amounts. In other embodiments, the control circuitry may implement an algorithm to determine a location based on a battery status provided by a device to be charged. The various locations, preprogrammed or algorithmically determined, may be in reference to a base location, such as the location 405.

Figure 5:
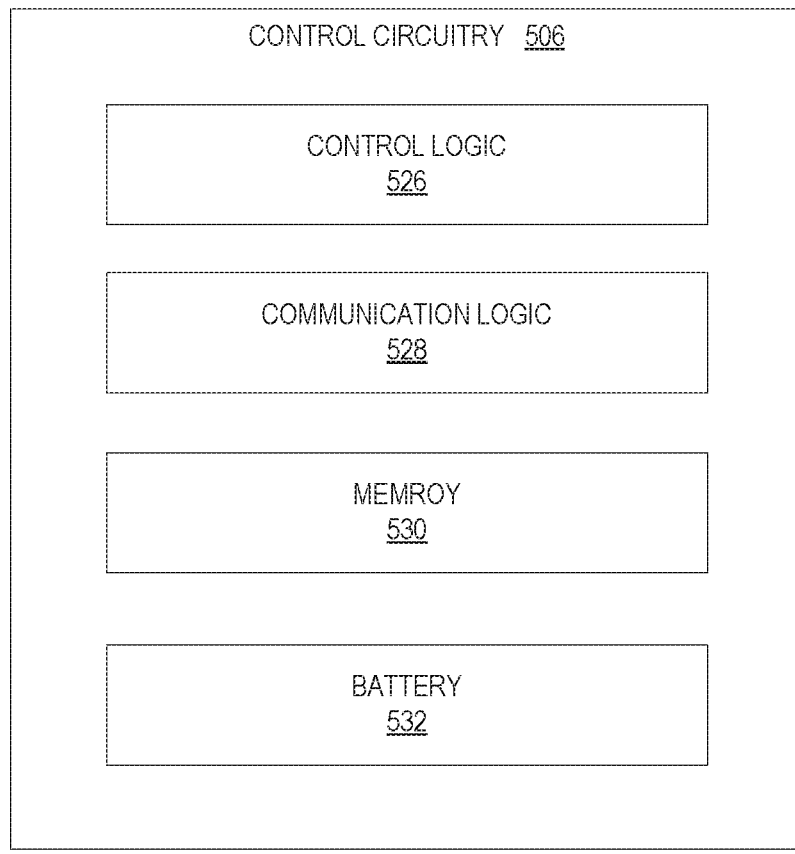
FIG. 5 is a functional block diagram of control circuitry 506 in accordance with an embodiment of the disclosure.

FIG. 5 is a functional block diagram of control circuitry 506 in accordance with an embodiment of the present disclosure. Control circuitry 506 may be an example of the control circuitry 106 and/or 206. The illustrated embodiment of control circuitry 506 includes control logic 526, communication logic 528, memory 530, and a battery 532. In general, control circuitry 506 may control the operation of a fuel cell and communicate with a device to be charged. For example, the device to be charged may provide a current status level of the device's battery, which may be used by control circuitry 506 to determine how to actuate a fuel usage regulator. For example, the status level information may be used to determine a position to move the plate isolator 338.

The control logic 526 may be a dedicated circuit, such as an ASIC, or a microprocessor/microcontroller implementing software, firmware, or a combination thereof. The control logic may perform operations based on feedback form the device to be charged. For example, the control logic 526 may determine an amount of power to generate to charge the battery of the device. In some embodiments, the battery may be charged to a full capacity, but other fill levels are also possible. Based on the amount of power to generate, the control logic 526 may determine an area of the MEA, such as the MEA 210, to provide fuel so that the desired amount of power is generated. Subsequently, based on the area of the MEA to provide power, the control logic 526 may determine a portion of a fuel transport array to expose to fuel. For example, the control logic 526 may determine a number of capillary tubes 336 to expose to fuel to generate the desired power. Further, the control logic 526 may determine a distance to move the plate isolator 338, for example, to expose the desired number of capillary tubes 336.

In some embodiments, the control logic 526 may determine the amount of power to generate from a percentage level of the battery of the device. Additionally or alternatively, the determination of the amount of power to generate may also take into account other factors of the device, such as processor usage, user demand, battery life, battery hysteresis, temperature of the device, etc.

Communication logic 528 may provide communication protocols for communication between the fuel cell and a device to be charged. The communication signals may be transmitted back and forth through a charging port, for example. In some embodiments, the communication logic 528 may be dedicated coupled to receive and provide data to control logic 526. In other embodiments, communication logic 528 may be software or firmware operating on control logic 526.

Memory 530, which may be temporary or permanent storage, may provide storage for software and/or firmware for the control circuitry 506 and/or communication logic 528. Battery 532 may be coupled to provide power to the control circuitry 506. The battery 532 may be charged by the fuel cell itself, and may be a super capacitor, lithium ion battery, or any rechargeable energy source.

Figure 6:
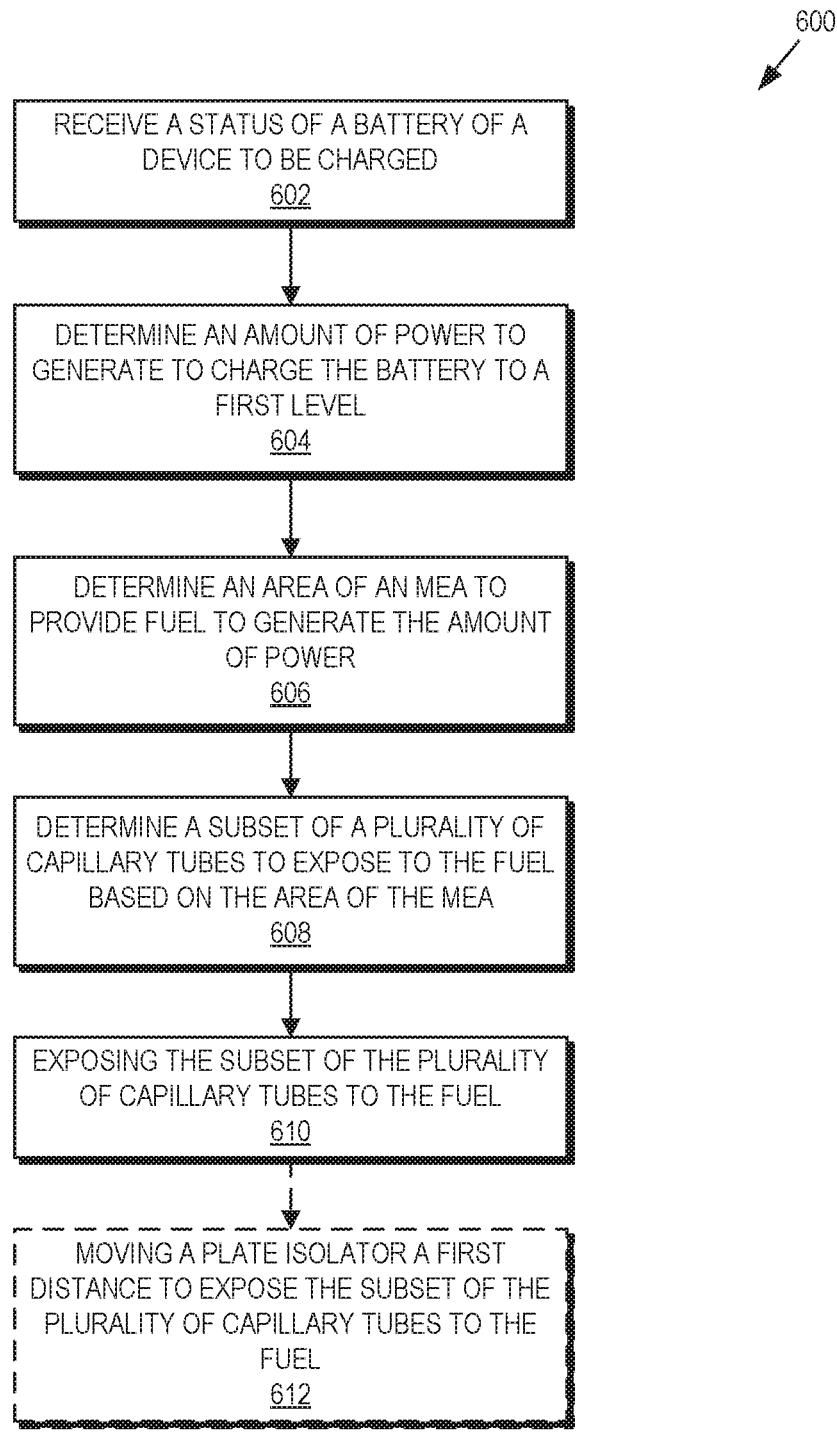
FIG. 6 is an example method 600 in accordance with an embodiment of the disclosure.

FIG. 6 is an example method 600 in accordance with an embodiment of the present disclosure. The method 600 may be performed by a fuel cell 102, 202, and/or 302 to generate a variable amount of power on demand. Method 600 may begin at process block 602 with receiving a status of a battery of a device to be charged. The status of the battery may provide a current level of charge of the battery, or it may provide an amount of power to charge the battery to a desired level. In some embodiments, the desired level may be 100% charged. The battery status may be received by control circuitry of the fuel cell, for example.

The process block 602 may be followed by the process block 604, which includes determining an amount of power to generate to charge the battery to a first level. The amount of power to generate may be based on the status of the battery, and the first level may be a desired level of the device. The first level may be fully charged, for example. Control circuity may determine the amount of power to generate based on the status of the battery, or on the desired level of the device.

The process block 604 may be followed by the process block 606, which includes determining an area of an MEA to provide fuel. The area of the MEA to provide fuel may be determined by the control circuitry, and may be based on the amount of power to generate. The process block 606 may be followed by the process block 608, which includes determining a subset of capillary tubes of a plurality of capillary tubes to expose the fuel. The determining of the subset of capillary tubes may be performed by the control circuitry, and may be based on the area of the MEA to provide the fuel.

The process block 608 may be followed by the process block 610, which includes exposing the subset of capillary tubes to the fuel. In some embodiments, the process block 610 may include the process block 612, which includes moving a plate isolator a first distance to expose the subset of capillary tubes to the fuel. By exposing the subset of capillary tubes to the fuel, the fuel may be transported to an area of the MEA associated with the subset of capillary tubes. Accordingly, an amount of power associate with the area of the MEA may be generated by the fuel cell.

The order in which some or all of the process blocks appear in method 600 should not be deemed limiting. Rather, one of ordinary skill in the art having the benefit of the present disclosure will understand that some of the process blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A fuel cell comprising: an anode configured to provide output power of the fuel cell; a cathode additionally configured to provide the output power of the fuel cell; a membrane electrode assembly (MEA) disposed between the anode and the cathode, the MEA being configured to generate the output power in response to exposure to a fuel; a plurality of capillary tubes configured to deliver, via capillary action, the fuel to the MEA, a fuel usage regulator; and a control system configured to operate the fuel usage regulator to (i) allow the fuel to flow through one or more capillary tubes of the plurality of capillary tubes to the MEA via capillary action and alternatively, (ii) prevent the fuel from flowing through the one or more capillary tubes of the plurality of capillary tubes to the MEA via capillary action; and wherein the fuel cell is configured to charge a battery and the control system is configured to monitor a charge status of the battery and to determine a number of capillary tubes to expose to the fuel based on the charge status of the battery.

2. The fuel cell of claim 1, wherein the fuel usage regulator is configured to move to expose the one or more capillary tubes to the fuel.

3. The fuel cell of claim 1, wherein the control system is configured to determine the number of capillary tubes based on an area of the MEA to which the fuel is to be provided.

4. The fuel cell of claim 3, wherein the control system is configured to determine an area of the MEA to be provided fuel based on an amount of output power that is to be generated.

5. The fuel cell of claim 1, further comprising a reservoir containing the fuel.

6. The fuel cell of claim 5, wherein the plurality of capillary tubes extends into the reservoir.

7. The fuel cell of claim 6, wherein the fuel usage regulator is configured to seal off the plurality of capillary tubes from the fuel.

8. The fuel cell of claim 1, wherein the anode comprises a plurality of vias, and wherein the plurality of capillary tubes extends through the plurality of vias.

9. A method performed by a control system, the method comprising: detecting a charge status of a battery that is configured to be charged by a fuel cell, the fuel cell comprising an anode, a cathode, a membrane electrode assembly (MEA) disposed between the anode and the cathode, a plurality of capillary tubes, and a fuel usage regulator; identifying, based on the charge status, one or more capillary tubes of the plurality of capillary tubes; and operating the fuel usage regulator to allow fuel to flow through the one or more capillary tubes to the MEA via capillary action; and based on the charge status of the battery, determining an amount of power for the fuel cell to generate; and based on the amount of power, determining an area of the MEA to which fuel is to be provided.

10. The method of claim 9, wherein identifying the one or more capillary tubes comprises identifying the one or more capillary tubes based on the area of the MEA.

11. The method of claim 9, wherein operating the fuel usage regulator to allow fuel to flow through the one or more capillary tubes to the MEA via capillary action includes moving a plate isolator of the fuel cell to expose the one or more capillary tubes to the fuel.

12. The method of claim 9, further comprising providing power to the battery.

13. A fuel cell comprising:
a cathode configured to provide electrical power generated by the fuel cell;
an anode additionally configured to provide electrical power generated by the fuel cell;
a membrane electrode assembly (MEA) configured to receive fuel and generate the electrical power in response to receiving the fuel;
a plurality of capillary tubes configured to deliver, via capillary action, the fuel to the MEA;
a fuel usage regulator; and a control system configured to detect a charge status of a battery that is configured to receive the electrical power from the fuel cell, the control system being further configured to:
  determine an amount of power for the fuel cell to generate based on the battery status;
  based on the amount of power, identify one or more capillary tubes of the plurality of capillary tubes; and
  operate the fuel usage regulator to allow the fuel to flow through the one or more capillary tubes to the MEA via capillary action.

14. The fuel cell of claim 13, wherein the control system is further configured to:
  based on the amount of power, determine an area of the MEA to which to provide the fuel.

15. The fuel cell of claim 14, wherein the control system is further configured to:
  based on the area of the MEA, determine a distance to move the fuel usage regulator.

16. The fuel cell of claim 13, further comprising a reservoir containing the fuel, wherein the fuel usage regulator is disposed within the reservoir, and wherein the plurality of capillary tubes at least partially extend into the reservoir.

17. The fuel cell of claim 13, wherein the plurality of capillary tubes extends through vias formed in the anode.

* * * * *